United States Patent [19]

Hendry

[11] Patent Number: 5,186,884
[45] Date of Patent: Feb. 16, 1993

[54] METHOD OF INJECTION MOLDING WITH PRESSURIZED FLUID ASSIST

[75] Inventor: James W. Hendry, Brooksville, Fla.

[73] Assignee: Milad Limited Partnership, Naples, Fla.

[21] Appl. No.: 711,288

[22] Filed: Jun. 6, 1991

[51] Int. Cl.⁵ .................. B29C 45/00; B29D 22/00
[52] U.S. Cl. .................. 264/572; 264/328.8; 264/328.12; 264/328.13
[58] Field of Search .............. 264/85, 328.8, 328.12, 264/328.13, 500, 572

[56] References Cited

U.S. PATENT DOCUMENTS 4,942,006 7/1990 Loren .................. 264/85 X
4,943,407 7/1990 Hendry .................. 264/572

Primary Examiner—Leo B. Tentoni
Attorney, Agent, or Firm—Brooks & Kushman

[57] ABSTRACT

A method and system for the injection molding of plastic articles of enhanced surface quality using pressurized fluid introduced into the article defining cavity or runner of a mold by a sealed pin or valve having an orifice therein and movable between open and closed positions to inject gas into a subgate of the mold. In one embodiment, the fluid is a gas which is injected through the subgate between a pair of seals. The seals and the subgate prevent gas leakage around the periphery of the pin. The fluid is prevented from contaminating the molten resin in a nozzle from which it was injected to eliminate splay by either using a shut-off valve with the nozzle or by introducing the pressurized fluid into the molten resin parallel to its direction of flow. The method involves the initial step of injecting molten resin at a nominal injection pressure from the nozzle of an injection molding machine through a resin injection aperture at an upstream position in a mold. The resin travels along a resin flow path in the mold to the cavity defining the shape of the molded article at a downstream position. During or after resin injection, the pressurized charge of fluid enters the flow path at the orifice and passes into the mold cavity to distribute the molten plastic within the mold cavity. The fluid is contained within the mold cavity under pressure until the article has set up, and is thereafter vented.

11 Claims, 3 Drawing Sheets

METHOD OF INJECTION MOLDING WITH PRESSURIZED FLUID ASSIST

CROSS-REFERENCE TO RELATED APPLICATION

This application is related to and incorporated by reference in its entirety U.S. Ser. No. 07/674,997 filed Mar. 28, 1991 entitled "Method And System For The Injection Molding Of Plastic Articles Utilizing A Fluid Compression Unit."

TECHNICAL FIELD

This invention relates to the use of fluid pressure in a method and system for injection molding.

BACKGROUND ART

It is known in the plastic molding art to use pressurized fluid in conjunction with the plastic molding of articles. The pressurized fluid is typically nitrogen gas which is introduced into the mold cavity with the molten plastic. An example of such a use is shown in U.S. Pat. No. 4,101,617.

The pressurized fluid serves a number of purposes. First, it allows the article so formed to have hollow interior portions which correspond to weight and material savings. Second, the pressurized fluid within the mold cavity applies outward pressure to force the plastic against the mold surfaces while the articles set. This is desirable toward enhancing surface quality by minimizing sink marks in areas of the article having relatively thicker plastic sections, such as structural ribs. Other advantages include: reduced stress and warpage for painting; better control on knit line location; larger parts on presses with reduced tonnage; reduced time cycles for thick sections; eliminate hot runners; good surface finish; and reinforcement with tubular section.

However, the added equipment and process control parameters required to implement fluid injection contribute significantly to the cost and complexity of this type of injection molding.

Another concern is that when the gas and plastic are injected into the mold from the same nozzle, the gas gets trapped in the nozzle area thereby foaming any molten resin in that area during venting. This foamed plastic causes blemishes (i.e. splay) in the next part when injected into the mold.

Of particular concern are the fluid charging components and circuits needed to charge, inject and vent the pressurized fluid at the controlled times and pressures necessary for quality part production on a repeatable, volume basis. Prior art devices addressing this concern have answered with complex valves and seals which are expensive, difficult to operate, and require maintenance or replacement at frequent intervals. The problem is especially acute with seals whose performance diminishes over their useful life.

Examples of the injection of pressurized fluid separate from the plastic injection nozzle are illustrated in U.S. Pat. Nos. 4,935,181; 4,555,225; 4,740,150; and 4,942,006. While it is often desirable to introduce the pressurized fluid as close to the article-defining cavity as possible to shorten the path of the pressurized fluid through the plastic resin, one problem of many of such devices is that the aperture through which the pressurized fluid flows can become clogged with molten plastic. Another problem is uncontrolled pressurized fluid leakage about the pin through which the pressurized fluid is introduced into the article in the mold.

U.S. Pat. No. 4,943,407 discloses a method, system and device which are provided for the injection molding of plastic articles using a pressurized fluid, normally nitrogen gas, wherein the gas is prevented by the device from contaminating the molten resin in the nozzle utilized therein. In one embodiment of the '407 patent, a rotary valve is utilized in the device which is located in the sprue area of the mold. In one position of the valve, molten plastic flows therethrough. In another position of the valve, gas is communicated into the sprue with the valve blocking the flow of plastic.

Published French patent document No. P.V. 8912991 entitled "Injection of Gas Under Pressure Into A Fabrication Mold Coming As A Single Piece Of Plastic Material, The Mold And Process Using Such An Injector, And The Plastic Part Obtained" discloses a fixed gas injector which projects into the mold cavity. Gas is injected into the cavity through a very small diametral play between a sheath and a needle of the injector.

SUMMARY OF THE INVENTION

An object of the present invention is to provide a method and system for injection molding of plastic articles utilizing a sealed valve adjacent to or in the article-defining cavity and movable between open and closed positions to introduce pressurized fluid while preventing contamination of the molten resin in a nozzle of the system.

In carrying out the above object and other objects of the present invention, a method for the injection molding of a plastic article in an injection molding system is provided. The system includes a resin injection nozzle and a mold having an injection aperture for receiving molten resin from the nozzle at an upstream position, a mold cavity at a downstream position, a resin flow path for fluidly communicating the injection aperture and the mold cavity between the upstream and downstream positions and a subgate in communication with the resin flow path. The method includes the steps of pressurizing a charge of fluid at a predetermined pressure level and injecting a quantity of molten plastic from the injection nozzle through the injection aperture and the flow path and into the mold cavity at a nominal injection pressure. The method also includes the steps of communicating the charge of pressurized fluid to an orifice opening to the subgate and the resin flow path in the mold between the upstream and downstream positions and introducing the fluid charge into the flow path from the orifice to distribute the molten plastic within the mold cavity. The method further includes the steps of preventing the introduced fluid charge from traveling from the flow path through the injection aperture and into the injection nozzle, containing the fluid under pressure in the article until it has set up in the mold cavity, and venting the fluid to ambient. The mold includes valve means having the orifice located remote from the injection nozzle and movable relative to the rest of the mold between fluid open and fluid closed positions. The valve means allows the fluid charge to travel through the orifice in the fluid open position and prevents the flow of the fluid charge through the orifice and into the flow path in the fluid closed position. The step of introducing includes the step of moving said valve means and the orifice. The flow path does not extend into the valve means.

Further in carrying out the above object and other objects of the present invention, an injection molding system for the injection molding of plastic articles is provided. The system includes an injection molding machine including an injection nozzle for introducing molten plastic through the nozzle and a mold having a resin injection aperture for receiving the molten plastic at an upstream position, a cavity defining the shape of the molded article at a downstream position, a resin flow path for fluidly communicating the injection aperture and the cavity between the upstream and downstream positions and a subgate in communication with the flow path. The system also includes fluid charge means for pressuring a charge of fluid at a predetermined level, and fluid circuit means interconnecting the flow path and the fluid charge means between the upstream and downstream positions at an orifice opening to the subgate for introducing the fluid charge into the flow path so that the fluid charge distributes the molten plastic in the mold cavity. The fluid circuit means further includes valve means having the orifice located remote from said injection nozzle and movable relative to the rest of the mold between open and closed positions. The valve means introduces the fluid charge to the flow path through the orifice and the subgate in the open position and prevents communication of the fluid charge to the flow path in the closed position. The flow path does not extend into the valve means.

Preferably, the valve means is movable in a rotary fashion.

Also, preferably, the valve means includes an ejector pin movable relative to the rest of the valve means between extended and retracted positions. Also, preferably, the method further includes the steps of opening the mold and ejecting the article from the mold cavity by moving the ejector pin to its extended position after the step of opening.

The location of the fluid entry orifice or point is downstream of the injection nozzle and adjacent to or in the article-defining cavity in an area of the mold where the mold is relatively cool. In many conventional prior art designs, the fluid entry point is through the injection nozzle in an area where the plastic is relatively hot and is at its molding temperature.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

General Method Of Operation

Figure 1:
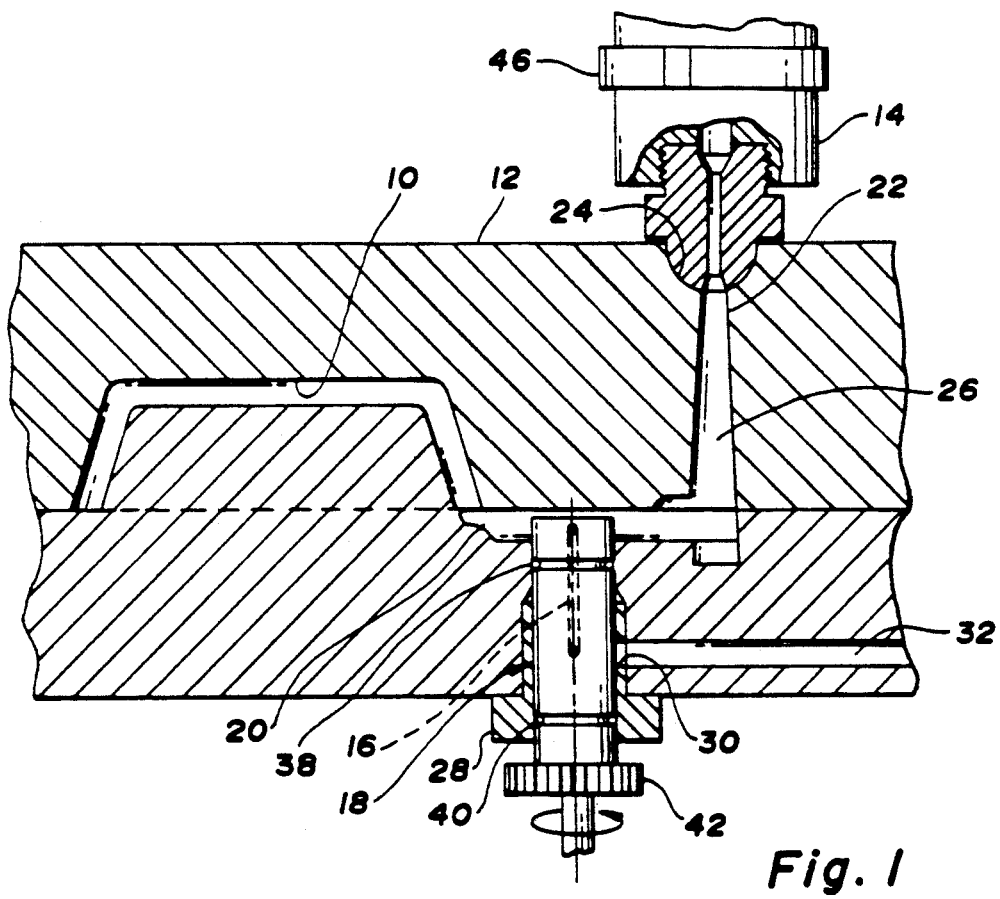
FIG. 1 is a sectional view, partially broken away, illustrating the method and system of the present invention wherein a nozzle of the system includes a shut-off valve.

Referring to FIG. 1, the method provides for molding of plastic articles with hollow interior sections where pressurized fluid is present in the formation of the article in a mold cavity 10 defined by a mold 12. The presence of the pressurized fluid creates an outward pressure which minimizes sink marks and reduces the material requirements and weight of the molded article.

Initially, a charge of fluid is pressurized at a predetermined level which may be higher or lower than the nominal plastic injection pressure. The preferred method and system for pressurizing the fluid is disclosed in the above-noted co-pending application. If the charge of fluid is introduced during resin injection, the charge of fluid may be at a lower pressure than the pressure of the plastic injection pressure. If the charge of fluid is introduced after resin injection, the charge of fluid may be either higher or lower than the plastic injection pressure.

Then the quantity of molten plastic is injected from a nozzle 14 of a conventional injection molding machine through a flow path into the mold cavity 10 at the nominal injection pressure. The quantity of molten plastic, i.e. the plastic shot, is less than the quantity of plastic which would be ordinarily required to fill the mold cavity.

Then the charge of pressurized fluid, preferably nitrogen gas, is communicated from a chamber and into the flow path through an orifice 16 which extends through a gas pin or valve, generally indicated at 18.

The charge of pressurized fluid is controlled to flow through the orifice 16 upon substantial completion of the plastic injection. This causes the fluid charge to enter the flow path and to continue into the mold cavity. The pressurized fluid is contained within the molding while the plastic solidifies and defines the shape of the molded article. During this time, pressurized fluid exerts outward pressure which forces the plastic to conform to the detail of the mold surface and exhibit fine detail with minimal sink marks or other surface defects.

Finally, the fluid is vented to ambient from the mold cavity prior to opening the mold and removing the finished molded article.

DESCRIPTION OF THE SYSTEM

FIG. 1 is a general schematic view of the embodiment of a system suited for practicing the plastic injection molding method of the present invention.

The controlled entry of pressurized fluid, typically nitrogen gas, is accomplished by use of a modified mold 12. The mold 10 includes the gas pin or valve 18 which is rotatably mounted either in or adjacent a runner 20 of the lower half of the mold 12.

A mold sprue 22 cooperates with the nozzle 14 of a conventional plastic injection molding machine. The nozzle 14 of the molding machine mates with a concave surface 24 on the face of the mold 12 to provide a continuous path 26 for the flow of plastic from the machine through the sprue 22 and into the mold cavity 10.

The introduction of pressurized fluid to the flow path is through the orifice 16.

The valve 18 is shown rotatably mounted in the mold 12 by a bushing 28 which has a hole 30 which extends therethrough and which is aligned with a gas passage 32 which extends through the lower half of the mold 12.

Figure 7:
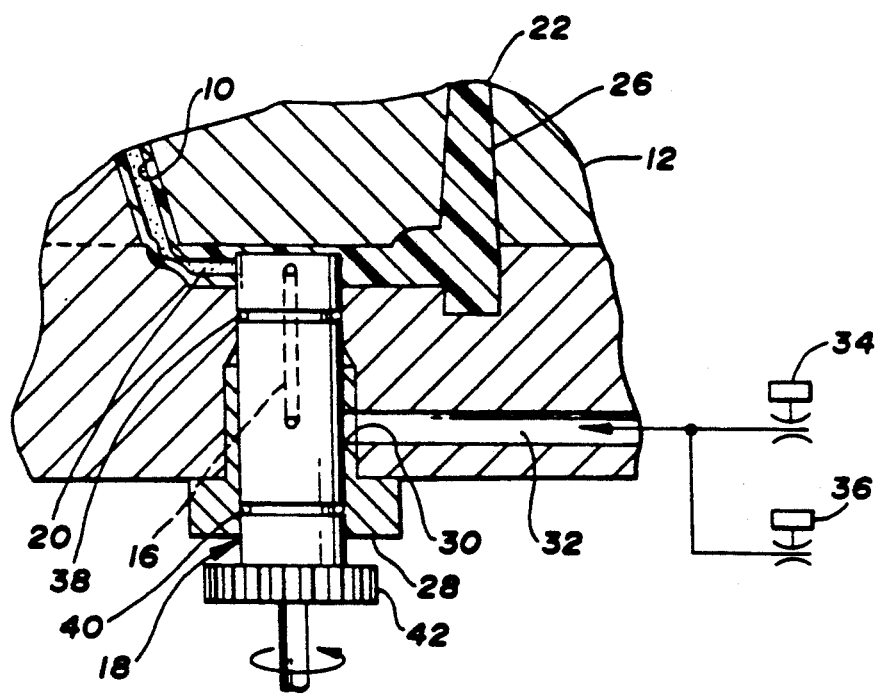
FIG. 7 is a sectional view, partially broken away, illustrating the condition of the mold and the plastic article after gas has been injected into the mold with the gas valve offset from the runner.

With reference to FIG. 7, the flow of gas in the gas passage 32 is controlled by a gas input valve 34 and a gas output valve 36. The gas input valve 34, in turn, is in communication with a system for the charging and communication of pressurized fluid, or gas, to the valve 18 as described in detail in the above-noted application.

O-rings 38 and 40 provide a gas seal between the valve 18 and the mold 12 and between the valve 18 and the bushing 28, respectively.

The lower portion of the valve 18 has a rack or rotary gear 42 fixedly secured thereto to allow a rotary actuator or other actuator to rotate the gear 42 and, consequently, the entire valve 18.

The valve 18 also includes an ejector pin 44 slidably mounted in the rest of the valve 18 to move between extended and retracted positions. During movement from the retracted position to the extended position, the pin 44 is capable of ejecting a plastic part from the mold 12 when the mold 12 is opened.

OPERATION

Figure 2:
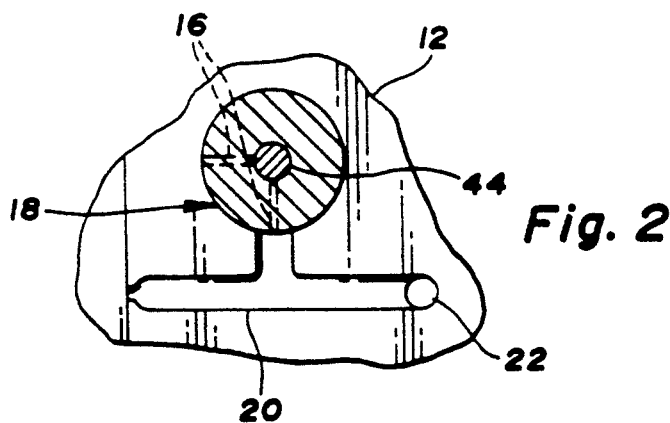
FIG. 2 is a sectional view of a gas pin or valve having an ejector pin located on the side of a runner of the mold of FIG. 1 and illustrating open and closed positions of the valve by phantom lines.
Figure 3:
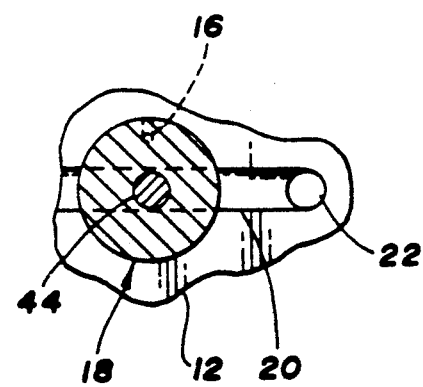
FIG. 3 is a view similar to FIG. 2 except the gas valve is located in the runner in its closed position.
Figure 4:
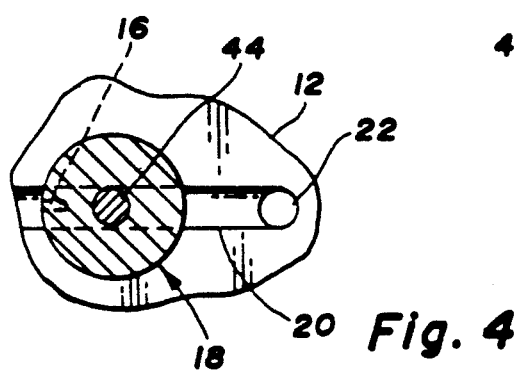
FIG. 4 is a view similar to FIG. 3 with the gas valve in its open position.
Figure 5:
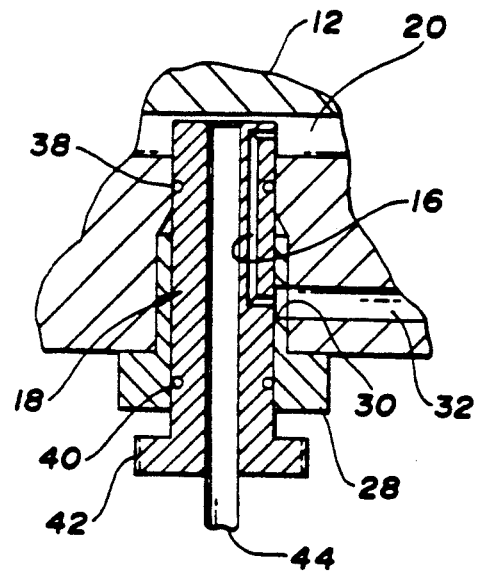
FIG. 5 is a sectional view, partially broken away, with the gas valve in its open position.
Figure 6:
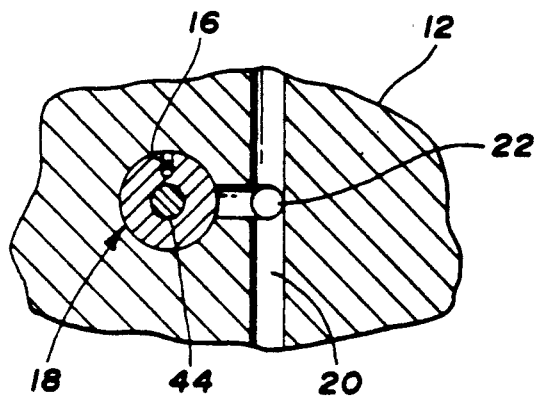
FIG. 6 is a view similar to FIG. 2 further illustrating the orifice in the gas pin.

During a plastic injection stroke or shortly thereafter, the valve 18 is rotated so that the orifice 16 is rotated from its closed position to its open position as illustrated in FIGS. 2–4. Then, a gas charge is communicated through fluid passage 32 to the fluid injection orifice upon energizing the valve 34 (valve 36 being closed). The fluid pressure at the orifice 16 is at a predetermined level. The level of fluid pressure at the orifice 16 may be determined through a few manual trial cycles and review of the surface quality of the molded articles produced at the trial pressures.

As the gas is injected, it follows the path of least resistance within the mold cavity. Since the molten plastic cools and hardens from its outer surface inwardly, the gas will penetrate the inner, warmer, softer part of the plastic normally formed with thicker sections, e.g. a structural rib, creating a hollow within the plastic in this area and expanding it outwardly to fill the mold cavity. During the gas injection phase of the molding cycle, the gas pressure can be held at an effectively constant level or it can be allows to decay as the gas expands within the plastic.

In practice it has been found that the injected fluid meets with an initial resistance upon reaching the plastic in the mold cavity, and once it penetrates the plastic resistance steps down substantially. Hence, an initially higher breakthrough pressure should be maintained for the fluid, and thereafter the fluid pressure can be decreased, in a step function or otherwise, to avoid unnecessarily high fluid pressure within the plastic article while it is setting up in the mold cavity. A controlled reduction in pressure will tend to minimize the chance of straining the part before the plastic has cooled and hardened. If the part is strained, the part will distort outside the mold.

When the plastic article has cooled sufficiently to be structurally self-supporting, the gas within it is vented to atmosphere under control of the valve 36 through the same orifice 16 by which it entered (the valve 34 being closed). Ventilation may be accomplished solely via the orifice 16 or in combination with movement of the nozzle 14 away from the mold 12 (i.e. sprue break).

It is preferred to meter or regulate the ventilation of gas to ambient to minimize the risk of drawing any fluent plastic or impurities with the fluid and thereby contaminating or clogging the fluid path. The mold can then be opened and the molded article ejected by means of the ejector pin 44.

With the valve 18 offset from the runner 20, gas will tend to travel toward the sprue 22 as illustrated in FIG. 7. Consequently, a shut-off valve 46 is to be employed in the nozzle 14 to prevent such gas entry into the nozzle 22. Rather, the gas will tend to pack the molten resin in the sprue 22 of the mold 12.

With the valve 18 actually in the cavity 10 or in the runner 20 pressurized gas is prevented from contaminating the plastic in the nozzle 12 even in the absence of a shut-off valve by injecting the gas in the same direction as plastic flow as illustrated in FIG. 4.

As can be readily appreciated, the orifice 16 never directly opens into the direction of plastic flow along the resin flow path between the upstream position and the downstream position. Consequently, there is little, if any, problem of plastic solidifying in the orifice 16 unlike the prior art designs.

Figure 8:
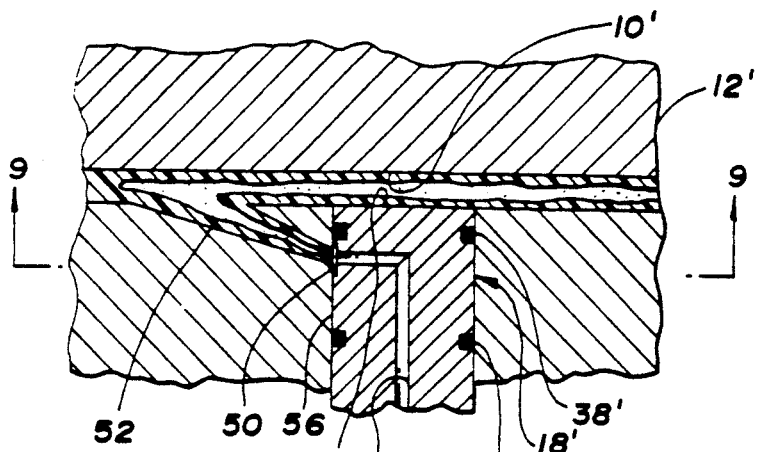
FIG. 8 is a sectional view, partially broken away, illustrating the condition of the mold and the plastic article after gas has been injected into the article through the gas pin and a subgate.
Figure 9:
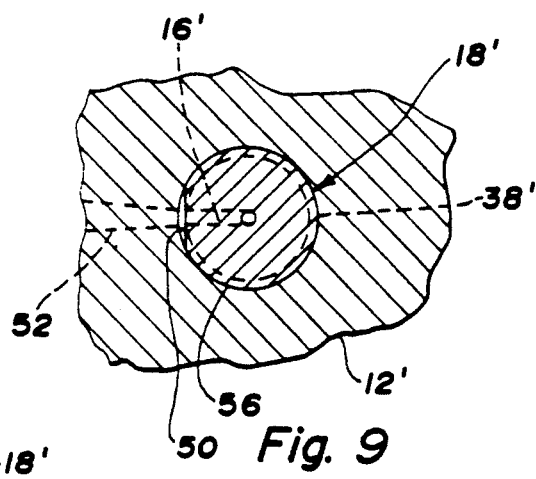
FIG. 9 is a sectional view, partially broken away, taken along line 9—9 of FIG. 8 with the gas valve pin in the open position.
Figure 10:
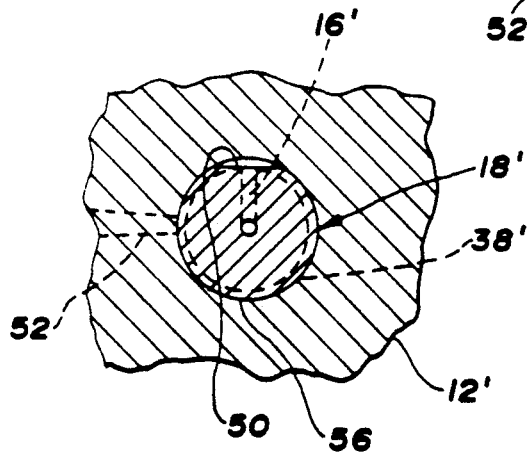
FIG. 10 is a view similar to FIG. 9 with the gas valve in its closed position.

Referring now to FIGS. 8 through 10, there is illustrated another embodiment of the invention wherein a pin or valve means generally indicated at 18' is rotatably mounted in a modified mold 12'. The pin 18' is sealed by a pair of spaced circular seals 38' and 40'.

Pressurized gas is injected into an article-defining cavity 10' in the mold 12' through an orifice 16', through a flat portion 50 of the pin 18', and through a subgate 52 formed in the mold 12'. The orifice 16' opens to the subgate 52 between the spaced seals 38' and 40'. The seals 38' and 40' and the use of the subgate 52 stop pressurized gas from escaping out around the sides of the pin 18'. In other words, the subgate 52 and the seals 38' and 40' make the pin 18' "gas tight." The flat portion 50 of the pin 18' is provided so the aperture in the subgate 52 does not have to align itself exactly to the orifice 16' in the open position of the pin 18' as illustrated in FIG. 9. FIG. 10 shows the pin 18' in its closed position.

The top surface 54 of the pin 18' at least partially defines the resin flow path in the article defining cavity 10' while the cylindrical side surface except at the area of the subgate 52.

Figure 11:
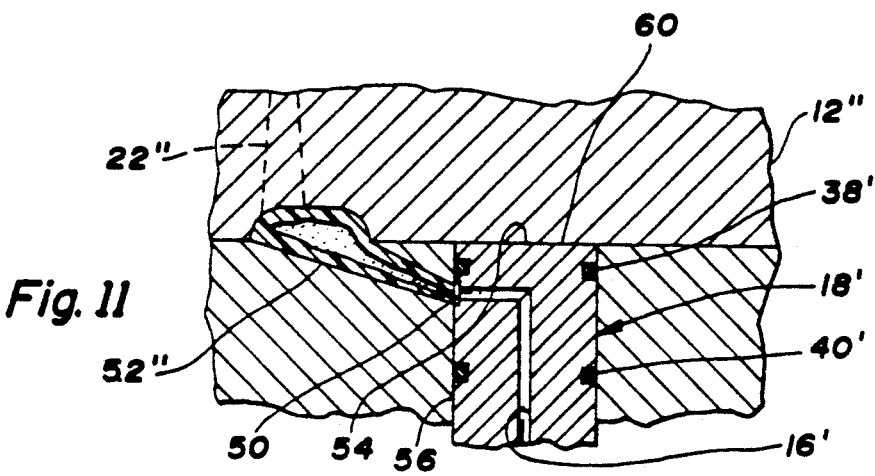
FIG. 11 is a view similar to FIG. 8 with the gas injected into the runner system and not into the article.

Referring now to FIG. 11, there is illustrated the rotary pin 18' in another modified mold 12". The pin 18' in FIG. 11, however, is in the runner system of the mold 12". Pressurized gas is injected into a subgate 52" in the mold 12" but not into a sprue 22" of the mold 12". Rather, gas from the subgate 52" flows into the article-defining cavity (not shown). In the mold 12" the top surface 54 of the pin 18' helps to define the parting line 60 of the mold 12".

Again, as in the embodiment of FIGS. 8 through 10, the seals 38' and 40' together with the use of the subgate 52" prevent pressurized gas from escaping from around the side surface 56 of the pin 18' (i.e. the gas takes the path of least resistance—into the resin in the subgate 52").

While each of the pins 18' and 18 are illustrated as being rotary pins, at least one aspect of the present invention can be practiced using a linearly movable pin and an apertured pin shroud to inject gas through a subgate of the mold.

While the best mode for carrying out the invention has been described in detail, those familiar with the art to which this invention relates will recognize various alternative designs and embodiments for practicing the invention as defined by the following claims.

What is claimed is:

1. A method for the injection molding of a plastic article in an injection molding system including a resin injection nozzle and a mold having an injection aperture for receiving molten resin from the nozzle at an upstream position, a mold cavity at a downstream position and a resin flow path for fluidly communicating the injection aperture and the mold cavity between the upstream and downstream positions, and a subgate in communication with the resin flow path, the method comprising the steps of:

pressurizing a charge of fluid at a predetermined pressure level;

injecting a quantity of molten plastic from the injection nozzle through the injection aperture and the flow path and into the mold cavity at a nominal injection pressure;

communicating the charge of pressurized fluid to an orifice opening to the subgate and the resin flow path in the mold between the upstream and downstream positions;

introducing the fluid charge into the flow path from the orifice to distribute the molten plastic within the mold cavity;

preventing the introduced fluid charge from traveling from the flow path through the injection aperture and into the injection nozzle;

containing the fluid under pressure in the article until it has set up in the mold cavity;

venting the fluid to ambient;

providing valve means in the mold adjacent to or in the mold cavity, the valve means having the orifice located remote from the injection nozzle and movable relative to the rest of the mold between fluid open and fluid closed positions, the valve means allowing the fluid charge to travel through the orifice, into the subgate and into the flow path in the fluid charge through the orifice in the fluid closed position and wherein said step of introducing includes the step of moving said valve means and the orifice and wherein the flow path does not extend into said valve means; and providing a pair of spaced seals wherein the valve means is sealed within the mold by the pair of spaced seals and wherein the orifice opens to the subgate between the seals, the seals and the subgate preventing fluid leakage between the valve means and the mold.

2. The invention of claim 1 wherein the fluid is a gas.

3. The method of claim 1 wherein the step of venting includes the step of separating the mold and the injection nozzle after the molten resin has cooled beneath its softening point.

4. The invention of claim 1 wherein the fluid is vented from the article through the same orifice as which it was introduced.

5. The method of claim 1 wherein said valve means includes an ejector pin movable relative to the rest of the valve means between extended and retracted positions and wherein said method further comprises the steps of opening the mold and ejecting the article from the mold cavity by moving the ejector pin to its extended position after the step of opening.

6. The invention of claim 1 wherein the orifice opens in a direction substantially parallel to the resin flow path.

7. The invention of claim 1 wherein the orifice opens in a direction substantially perpendicular to the resin flow path and wherein the nozzle includes a shutoff valve.

8. The invention of claim 1 wherein the orifice opens to the resin flow path at the mold cavity.

9. The invention of claim 1 wherein the mold includes a runner and wherein the orifice opens to the resin flow path at the runner.

10. The invention of claim 1 wherein the valve means has a top surface and a side surface, the top surface defining at least a portion of the resin flow path and the orifice extending through the side surface.

11. The invention of claim 1 wherein the valve means is rotatable in a rotary fashion.

* * * * *